United States Patent [19]

Kimura et al.

[11] Patent Number: 4,868,749

[45] Date of Patent: * Sep. 19, 1989

[54] SIGNAL PROCESSING METHOD IN AUTORADIOGRAPHY

[75] Inventors: Tsutomu Kimura; Kazuhiro Hishinuma, both of Kaisei, Japan

[73] Assignee: Fuji Photo Film Co., Ltd., Kanagawa, Japan

[*] Notice: The portion of the term of this patent subsequent to Jul. 25, 2006 has been disclaimed.

[21] Appl. No.: 568,879

[22] Filed: Jan. 6, 1984

[30] Foreign Application Priority Data

Jan. 8, 1983 [JP] Japan ................................ 58-1339
Jan. 8, 1983 [JP] Japan ................................ 58-1340

[51] Int. Cl.$^4$ .................. G01N 33/50; G01N 27/26; G01T 1/00; G21H 5/00
[52] U.S. Cl. .................................. 364/413.13; 382/6
[58] Field of Search .................. 364/413, 414; 382/6; 935/6, 77, 76; 436/169, 174

[56] References Cited

U.S. PATENT DOCUMENTS

| Re. 31,847 | 3/1985 | Luckey | 250/327.2 |
| 4,258,264 | 3/1981 | Kotera et al. | 250/459.1 X |
| 4,315,318 | 2/1982 | Kato et al. | 364/414 X |
| 4,320,415 | 3/1982 | Jones | 382/6 X |
| 4,389,670 | 6/1983 | Davidson et al. | 358/211 X |
| 4,496,973 | 1/1985 | Horikawa et al. | 364/414 X |
| 4,526,865 | 7/1985 | Silman | 435/803 |

FOREIGN PATENT DOCUMENTS 738602 6/1980 U.S.S.R. ............................ 364/413

OTHER PUBLICATIONS

Sanger, F. et al, "DNA Sequencing With Chain-Terminating Inhibitors" Proc. Natl. Acad. Sci U.S.A., vol 74, No. 12, pp. 5463–5467, 12/1977.
Smith, L. et al, "Fluorescence Detection in Automated DNA Sequence Analysis", Nature, vol. #321, 6/12/1986, pp. 674–678.

Primary Examiner—Jerry Smith
Assistant Examiner—Charles B. Meyer
Attorney, Agent, or Firm—Gerald J. Ferguson, Jr.

[57] ABSTRACT

A signal processing method in autoradiography for determination of the base sequence of DNA or a DNA fragment, employing groups of radioactively labeled base specific cleavage products or mixtures thereof obtained by specifically cleaving the DNA or DNA fragment labeled with a radioactive element and resolved one-dimensionally in parallel relation to each other to form resolved rows on a support medium. An autograph is obtained having locational information on groups of radioactively labeled cleavage products contained in the rows on the support medium. An electrical digital signal corresponding to the autoradiograph is then generated. Sampling points in each resolved row of the digital signal are next detected. Reference sampling points are then determined in a plurality of reference rows which are either directly provided on resolved row adjacent to the reference row to identify sampling points in adjacent resolved rows. Sampling points in the remaining non-reference rows are identified for determination of the base sequence of the DNA or DNA fragment.

10 Claims, 2 Drawing Sheets

SIGNAL PROCESSING METHOD IN AUTORADIOGRAPHY

BACKGROUND OF THE INVENTION

1. Field of the Invention

This invention relates to a signal processing method in autoradiography and more particularly, to a signal processing method for comparing and identifying the resolved positions of radioactively labeled substances in autoradiography for determination of base sequences of DNA and DNA fragment employing a radiosensitive material.

2. Description of the Prior Art

Autoradiography has been known as a method for obtaining locational information on radioactively labeled substances distributed in at least a one dimensional direction to form a row on a support medium.

For instance, autoradiography comprises steps of: labeling organism-originating biopolymers such as proteins or nucleic acids with a radioactive element; resolving the radioactively labeled biopolymers, derivatives thereof, or cleavage products thereof (hereinafter referred to as "radioactively labeled substances") on a gel support (support medium) through a resolving process such as electrophoresis to form a resolved pattern of the radioactively labeled substances (the resolved pattern is not visible); placing said gel support and a high-sensitivity type X-ray film together in layers for a certain period of time to expose the film and developing said film to obtain the autoradiograph of the resolved pattern as a visible image on the film; and obtaining the locational information of the radioactively labeled substances from said visible image. Further, the identification of the polymeric substances, determination of molecular weight of the polymeric substances and isolation of the polymeric substances can be performed based on the obtained locational information.

The autoradiography has been effectively utilized for determining the base sequence of nucleic acids such as DNA (or DNA fragments, hereinafter "DNA" is used to include DNA as well as DNA fragments) or the like.

The Maxam-Gilbert method and Sanger-Coulson method are known as methods for sequencing DNA utilizing autoradiography. In these methods, the base sequence of DNA is determined by utilizing the characteristic structure of DNA in that DNA is in the form of double helix structure consisting of two chain molecules, which are constituted by four constitutional base units, each unit having a base, namely adenine (A), guanine (G), thymine (T) or cytosine (C), and cros-linked by hydrogen bonding between the four bases, the hydrogen bonding between each constitutional base unit comprising only two combinations, namely G-C and A-T.

For instance, the Maxam-Gilbert method is carried out as follows: a group containing a radioactive isotope of phosphorus (P) is attached to a chain molecule of DNA or a DNA fragment at one end to be sequenced to prepare a radioactively labeled DNA molecule, and then the thus labeled DNA molecule is specifically cleaved at the constitutional base units by a certain chemical reactions. This reaction is called a "base specific cleavage reaction". Then the obtained mixture of numerous cleavage products of the DNA or DNA fragment is resolved through gel electrophoresis to give a resolved pattern of the numerous cleavage products (the pattern is not visible). An X-ray film is exposed to the resolved pattern and developed to obtain a visualized autoradiograph thereon, and the sequential position of each base from the radioisotopically labeled end of the chain molecules is read by referring to both the obtained autoradiograph and the applied base-specific chemical reaction so as to determine the sequence of all bases in the substance.

In the autoradiography utilizing the radiographic process, the visualization of the autoradiograph having locational information on radioactively labeled substances on a radiographic film is essentially required.

Investigators analyze the distribution of the radioactively labeled substances on a support medium through observation of the visualized autoradiograph. The sequence of DNA is determined by studying individual resolved positions of the radioactivity labeled cleavage products (or mixture of cleavage products) of DNA on the visualized autoradiograph, and then comparing the resolved positions among the resolved rows thereof.

Since the autoradiography requires the visual analysis of the autoradiograph, there is a drawback in that the locational information on the radioactively labeled substances obtained by analysis of the visualized autoradiograph varies or fluctuates depending on the skill of investigators, and the accuracy of the information is limited to a certain extent. Particularly, in such cases that the autoradiograph visualized on a radiographic film shows an image of reduced quality (in regard of sharpness, contrast, etc.), the satisfactory information can be hardly obtained and the accuracy is low. In order to improve the accuracy of the locational information, for instance, a visualized autoradiograph can be scanned with a device such as a scanning densitometer. However, such scanning process requires increased operation time and complicated procedures. Further, there is a limitation on increase of the accuracy when using this device.

For instance, in carrying out the exposing procedure, the support medium carrying the above-mentioned resolved rows thereon an a radiographic film sometimes cannot be accurately arranged together in layers. In such a case, the resolved rows (e.g., electrophoretic rows) visualized on the radiographic film are rendered not parallel to the longitudinal direction of the film to give a dislocated pattern. As a result, error is introduced into the visual analysis of the locational information on the radioactively labeled substances to decrease the accuracy thereof.

Further, the rows of the resolved radioactively labeled rows on the support medium are sometimes made non-parallel to the longitudinal direction of the support medium or made distorted, depending on the kind of the support medium or resolving conditions. For instance, a gel support medium is generally held between two glass plates in the resolving procedure because the gel lacks self-supporting property. As a result, the gel occasionally becomes uneven in thickness due to the deformation of the covers such as the glass plates and accordingly the radioactively labeled substances are not always resolved uniformly on the gel. The lack of uniformity of the resolved pattern is also caused by air foams contained in the gel or by heterogenous dispersion of the composition of the gel. For these reasons, a phenomenon such as the so-called smiling effect, i.e., a phenomenon that the migration distance of the resolved row in the vicinity of the center of the support medium is longer than those in both sides thereof, is often observed. Additionally, if the voltage is not applied uniformly to the support medium in the electrophoresis, the resolving conditions are made locally uneven on the support medium to distort the resolved rows.

There is known no suitable method but a method of manually correcting the distortion of resolved rows. Accordingly, it is not easy to analyze the locational information on the radioactively labeled substances in the above-described cases. Even if the aforementioned device is used, it is still difficult to obtain satisfactorily accurate locational information on the radioactively labeled substances.

SUMMARY OF THE INVENTION

The present inventors have discovered that the base seaquence of DNA of DNA fragment is determined with ease and high accuracy by a signal processing method. Said signal processing method comprises steps of obtaining a digital signal corresponding to the autoradiograph visualized on a radiosensitive material, which has the locational information on the radioactively labeled cleavage products of the DNA or DNA fragment, and subsequently processing the digital signal.

The present invention provides a signal processing method in autoradiography for determination of base sequence of DNA or DNA fragment, employing at least two groups or radioactively labeled cleavage products obtained by specifically cleaving the DNA or DNA fragment labeled with a radioactive element, comprising the steps of:

(1) providing a mixture each of cleavage products comprising four kinds of base specific cleavage products consisting essentially of guanine specific cleavage products, adenine specific cleavage products, thymine specific cleavage products and cytosine specific cleavage products; and (2) cleavage products containing providing at least one kind of base specific cleavage products, (3) resolving the reference mixtures provided in step (1) and the product group provided in step (2);
one-dimensionally in parallel relation to form at least two resolved rows on a support medium, (4) obtaining an autoradiograph having locational information on groups of radioactively labeled cleavage products contained in said rows on the support medium;

(5) generating an electrical digital signal corresponding to said autoradiograph including said rows;

(6) detecting reference sampling points in a reference row of the digital signal, the reference row being the resolved row of the mixture (1) of cleavage products comprising four kinds of base specific cleavage products;

(7) detecting sampling points in the resolved row other than the reference row; and (8) comparing the reference sampling points in the reference row of the digital signal with sampling points in a resolved row adjacent to said reference row to identify the sampling points in the adjacent resolved row.

The present invention also provides a signal processing method in autoradiography for determination of base sequence of DNA or a DNA fragment, employing at least three groups of radioactively labeled cleavage products obtained by specifically cleaving the DNA or DNA fragment labeled with a radioactive element, comprising:

(1) a mixture of cleavage products comprising the steps of four kinds of base specific cleavage products each consisting esssentially of guanine specific cleavage products, adenine specific cleavage products, thymine specific cleavage products and cytosine specific cleavage products; and (2) providing at least two groups of cleavage products in which one group of cleavage products contains at least one kind of base specific cleavage products different from base specific cleavage products contained in the other group of cleavage products, (3) resolving the reference mixtures provided in step (1) and the product group provided in step (2),
one-dimensionally in parallel relation to form at least three resolved rows on a support medium, (4) obtaining an autoradiograph having locational information on groups of radioactively labeled cleavage products contained in said rows on the support medium;

(5) generating an electrical digital signals corresponding to said autoradiograph including said rows;

(6) detecting reference sampling points in a reference row of the digital signal, the reference row being the resolved row of the mixture (1) of cleavage products comprising four kinds of base specific cleavage products;

(7) detecting sampling points in said one resolved rows other than the reference row;

(8) comparing reference sampling points in the reference row with sampling points in a resolved row adjacent to said reference row to identify the sampling points in the adjacent resolved row and determining imaginary reference sampling points in said resolved row based on thus indentified sampling points; and (9) comparing thus determined imaginary reference sampling points with sampling points in a resolved row adjacent to said resolved row for which thee reference sampling points are determined in the process (3) to identify the sampling points in the adjacent resolved row,
said process being applied to the above-mentioned digital signal.

The present invention further provides a signal processing method in autoradiography for determination of base sequence of DNA or DNA fragment, employing at least four groups of radioactively labeled cleavage products obtained by specifically cleaving the DNA or a DNA fragment labeled with a radioactive element, comprising:

(1) base specific cleavage products containing at least guanine specific cleavage products;

(2) base specific cleavage products containing at least adenine specific cleavage products;

(3) base specific cleavage products containing at least thymine specific cleavage products; and (4) base specifically cleabed product containing at least cytosine specific cleavage products, being resolved one-dimensionally in parallel relation to each other to form resolved rows on a support medium,
which comprises a process including:

(1) detecting sampling points in each resolved row;

(2) synthesizing a reference row from the plural resolved rows and assigning the sampling points in the reference row to reference sampling points;

(3) comparing the reference sampling points in the reference row with sampling points in a resolved row adjacent to the reference row employed for the synthesis of said reference row to identify the sampling points in the adjacent resolved row and determining imaginary reference sampling points in said resolved row based on thus indentified sampling points; and (4) comparing thus determined imaginary reference sampling points with sampling points in a resolved row adjacent to said resolved row for which the reference sampling points are determined in the process (3) to identify the sampling points in the adjacent resolved row, said process being applied to the above-mentioned digital signal.

In the present invention the reference row means a row corresponding to a resolved row of a mixture of all the cleavage products consisting of guanine specific cleavage products, adenine specific cleavage products, thymine specific cleavage products and cytosine specific cleavage products, and is employed as an internal reference for each resolved row of radioactively labeled base specific cleavage products in the signal processing for determination of the base sequence of DNA or DNA fragment.

The reference row (internal reference row) in the signal processing of the invention can be obtained by practically providing a resolved row of the mixture of all kinds of the base specific cleavage products of DNA on a support medium, or by synthesizing a reference row from resolved rows of cleavage products of DNA through the signal processing.

DETAILED DESCRIPTION OF THE INVENTION

The present invention utilizes the method which comprises steps of: placing a sample containing radioactively labeled substances and a radiosensitive material together in layers to record an autoradiograph of the sample on the radiosensitive material; reading out the autoradiograph photoelectrically to obtain electric signal; and converting the electric signal to digital signal through A/D conversion.

In the present invention, the term "locational information" of the radioactively labeled substances means to include a variety of information relating to the location of the radioactively labeled substances, or the aggregation thereof, being present in the sample, such as the location, the shape, the concentration, the distribution, and combinations thereof.

According to the present invention, the base sequence of DNA or DNA fragment can be determined with high accuracy, even if there occurs the distortion or dislocation in the overall length of the autoradiograph recorded on the radiosensitive material due to the locational distortion of resolved rows of the radioactively labeled substances on the support medium occurring in the course of the resolving procedure, or due to the locational distortion occurring between the support medium on which the resolved rows thereof are formed in one dimensional direction and the radiosensitive material in the course of the recording of the autoradiograph. Particularly for the distortion in the resolving direction, it makes possible to identify the resolved portions in each resolved row simultaneously with correction of the distortion so as to determine the sequence of DNA smoothly and with high accuracy.

In order to carry out the experiment for determining the base sequence of DNA efficiently, the resolved rows are generally provided on a support medium as many as possible. As a result, the distortion such as the aforementioned smilling effect generally occurs. In the present invention, the distortion can be corrected with respect to all the resolved rows utilizing the reference row (internal reference) in the signal processing, which is obtained by actually providing a resolved row of a mixture containing all the four kinds of base specific cleavage products of DNA on the support medium or by synthesizing from resolved rows of cleavage products of DNA.

Further, it is possible to identify the resolved positions of the radioactively labeled substances (namely, sampling points9 with high accuracy even if the area of the individual resolved portion thereof is reduced, because the sampling points can be automatically compared and identified between the resolved rows on the digital image data. This means that the absolute amount of the radioactively labeled substances used in one autoradiographic process can be reduced, otherwise that the number of rows resolvable on a single support medium can be increased without broadening the width of support medium so as to give more information than in the case employing the conventional analysis.

Examples of the sample employable in the present invention include a support medium on which base specific cleavage products and/or a mixture thereof, obtained by base-specifically cleaving radioactively labeled DNA or DNA fragment, are resolved (or developed) in one dimensional direction to form resolved rows.

Representative examples of the method for resolving (or developing) the above-mentioned radioactively labeled substances on a support medium include electrophoresis using one of various resolving mediums such as a gel in the form of layer, column or the like, a molded polymer film such as a cellulose diacetate film, and a filter paper, and a thin layer chromatography using a support of material such as silica gel. Among these, the electrophoresis using a gel support medium is preferably employed in the present invention.

The radiosensitive material used in the present invention has a basic structure comprising a support and a radiographic (photographic) emulsion layer. The radiographic emulsion layer comprises a binder such as gelatin and silver halide dispersed therein. For instance, the radiosensitive material is prepared by providing the above-mentioned emulsion layer onto the transparent support such as a polyethylene terephthalate sheet. A represeentative example of the radiosensitive material includes a radiographic film such as a high-speed type X-ray film.

In carrying out the exposing procedure, that is, the procedure of exposing the radiosensitive material to the radiation emitted from the support medium containing the radioactively labeled substances, at least a portion of the emitted radiation is absorbed in the radiosensitive substance of the radiosensitive material by placing the support medium and radiosensitive material together in layers for a certain period of time. The exposure can be accomplished by keeping the radiosensitive material in a position adjacent to the support medium, for instance, at a low temperature such as a temperature lower than 0° C. at least several days, and then the radiosensitive material is developed. In the exposing procedure, it is further possible to enhance the radiographic speed of the radiosensitive material by using a radiographic intensifying screen or applying thereto a preliminary exposure such as flash exposure.

The exposing procedure of the radiosensitive material to a sample and the developing procedure thereof in the autoradiographic process have been well known, and are described for instance in the following literature: Method in Biochemical Experiment, Volume 6, Method in Tracer Experiment I, 271-289, "8. Autoradiography" by Toru Sueyoshi & Akiyo Shigematsu (Tokyo Kagaku Dozin Ltd., 1977).

A method for reading out or detecting the autoradiograph having the information on one dimensional location of the radioactively labeled substance in the sample recorded on the radiosensitive material according to the invention will be described briefly, referring to an embodiment of a read-out system shown in FIG. 1 of the accompanying drawings.

Figure 1:
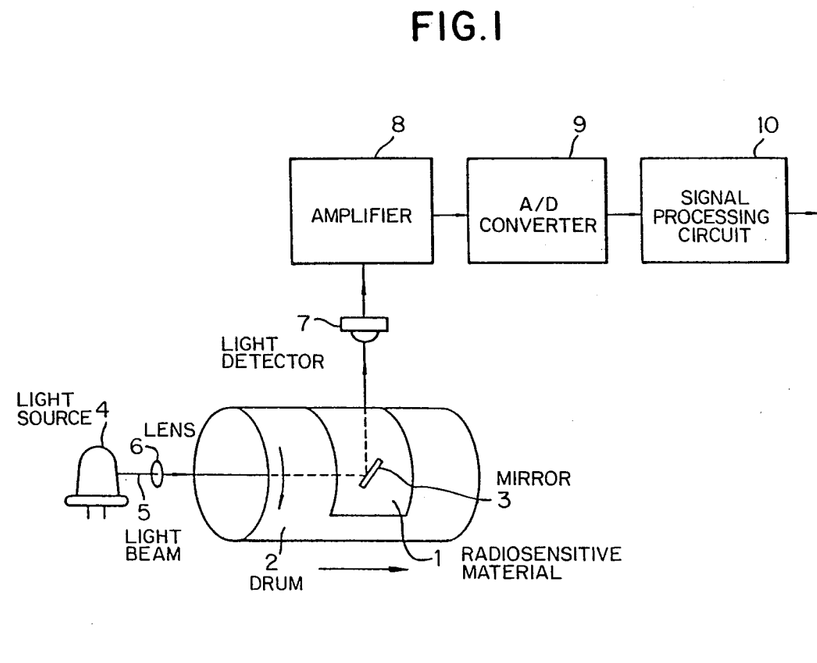
FIG. 1 shows an example of the read-out system for reading out an autordiograph having locational information on the radioactively labeled substances in the sample recorded on a radiosensitive material employable in the present invention.

FIG. 1 schematically illustrates an embodiment of the read-out system for reading out the autoradiograph having one dimensional information on the location of the radioactively labeled substances, which is recorded in the form of a visual image on a radiosensitive material 1.

The radiosensitive material 1 on which the visual image is recorded is mounted on a transparent and hollow drum 2. The drum 2 is moved in the axial direction at a certain speed as well as rotated about its axis at a certain pitch and a mirror 3 is fixed in the hollow drum 2. A light beam 5 generated by a light source 4 passes through a lens 6 and comes into the drum 2. The light beam is then reflected in the upper direction by the mirror 3 and passes through the radiosensitive material 1 mounted on the transparent drum 2. Thus, the radiosensitive material 1 is spot-scanned with the light beam in the X-Y scanning mode.

The light beam passing through each position of the radiosensitive material 1 is received by a light detector 7 and converted to an electric signal, which is amplified by an amplifier 8 and converted to a digital signal through an A/D converter 9.

More in detail, the read-out procedure is described in Japanese patent provisional publications No. 54(1979)-121043.

In the above description on the method for reading out the autoradiograph having the locational information on the radioactively labeled substance recorded on the radiosensitive material, a read-out procedure utilizes the light transmission method using a light beam, but the light reflection method can be also applied thereto. Further, the read-out procedure is by no means restricted to the above-mentioned embodiment, but other various methods such as a read-out procedure using a TV camera can be utilized.

Thus obtained digital signal corresponding to the autoradiograph of the sample is subsequently input into the signal processing circuit 10. In the signal processing circuit 10, the information on one dimensional location of the radioactively labeled substances is processed by the signal processing and represented by symbols and/or numeral, so as to determine the sequence of aimed DNA.

The signal processing method of the present invention for the determination of base sequence of DNA is described below, utilizing the above-mentioned Maxam-Gilbert method and referring to an example using the following four groups of base specific cleavage products:

(1) guanine (G) specific cleavage products, (2) guanine (G) specific cleavage products+adenine (A) specific cleavage products, (3) thymine (T) specific cleavage products+cytosine (C) specific cleavage products, (4) cytosine (C) specific cleavage products.

The above combination consisting of four groups of cleavage products is employable as an example of the case that a reference row is imaginarily obtained by synthesizing from resolved rows of the above four groups in the signal processing. In the present invention, the reference row can be also obtained by using a mixture of all the base specific cleavage products and practically providing a resolved row thereof on a support medium.

DNA labeled with a radioactive element ($^{32}P$) is specifically cleaved at the constitutional base unit according to the conventional manner to prepare the above four groups (1) to (4) of base specific cleavage products. The prepared four groups of radioactively labeled cleavage products are respectively resolved on a gel support medium through electrophoresis to obtain a sample. Then, the sample (support medium on which the resolved rows are formed) is placed on a radiosensitive material together in layers at a low temperature ranging from −70° C. to −80° C. for several days to perform the exposure, and the autoradiogaph of the sample is recorded on the radiosensitive material.

Figure 2:
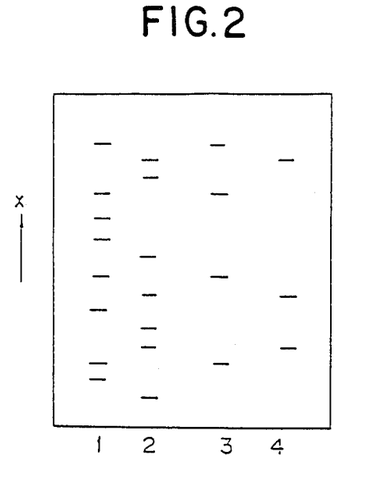
FIG. 2 shows an example of an autoradiograph of resolved rows comprising base specific cleavage products of DNA.

FIG. 2 shows an autoradiograph of resolved rows (electrophretic rows) comprising the above-mentioned four groups of radioactively labeled cleavage products of DNA. That is, the first to fourth rows shown in FIG. 2 correspond to in order, (1)-(G) specific cleavage products+(A) specific cleavage products, (2)-(T) specific cleavage products+(C) specific cleavage products, (3)-(G) specific cleavage products, (4)-(C) specific cleavage products.

The digital signal obtained by reading out the autoradiograph recorded on the radiosensitive material by means of the read-out system shown in FIG. 1 is provided with an address (X, Y) which is represented by a coordinate system fixed to the radiosensitive material and further with a signal level (Z) in its address which corresponds to the amount of the transmitting light. That is, the obtained digital signal corresponds to the autoradiograph shown in FIG. 2. Thus, digital image data having the locational information on the above-mentioned radioactively labeled cleavage products are input into the signal processing circuit 10. In the present invention, the digital image data mean a set of digital signals corresponding to the autoradiograph of the radioactively labeled cleavage products.

In the processing method, the resolved positions of the radioactively labeled cleavage products are, in the first place, detected on the digital image data with respect to the above-mentioned four rows and assigned to sampling points. For example, the sampling points are detected as follows.

The digital image data are scanned in different two positions in parallel and in such a manner that the scanning traverses the one-dimensional distributed (resolved) row of the radioactively labeled cleavage products to detect distribution points thereof in each row along each scanning area (this scanning for detecting the distribution points is referred to as preliminary scanning); and the two adjoining distributed points of each row are joined with a straight line to give totally four straight lines, the straight lines being assigned to scanning lines for detecting the sampling points in each resolved row.

In the signal processing method of the present invention, the obtained digital signal is temporarily stored in a memory device of the signal processing circuit 10 (that is, a non-volatile memory unit such as a buffer memory, a magnetic disk, etc.). In the signal processing, the scanning on the digital image data means an operation for selectively picking up only the signal in the scanning area from the memory device.

Subsequently, the scanning along the scanning line is performed on the digital image data to obtain a function f(W) which represents the signal level on the scanning area, wherein W represents the position on the scanning line. Smoothing is applied to the function f(W) through convolution with a suitable filter function and the like, to obtain a function g(W). Then, the threshold-processing is applied to the function g(W). More in detail, the function g(W) is converted into a continuous function having only 1 and 0 values by the following operation:

$$g(W) = 1 \text{ for } g(W) \geq \alpha_0$$

$$g(W) = 0 \text{ for } g(W) < \alpha_0$$

wherein $\alpha_0$ is a threshold value.

All middle points of regions of g(W)=1 in the function g(W) are assigned to sampling points. The threshold value ($\alpha_o$) employed in the threshold processing can be determined, for instance, based on a relationship between the signal levels and the frequency of occurrence thereof with respect to the digital signal in the scanning area, namely by employing a histogram.

Thus, the sampling points $S_{kn}$ can be detected for each row, wherein k is a positive integer and represents the number of row; and n is a positive integer and represents the number of the sampling point. The sampling point $S_{kn}$ means the n-th sampling point in the k-th row. The process for detecting the sampling points is by no means restricted to the above-described process.

Figure 3:
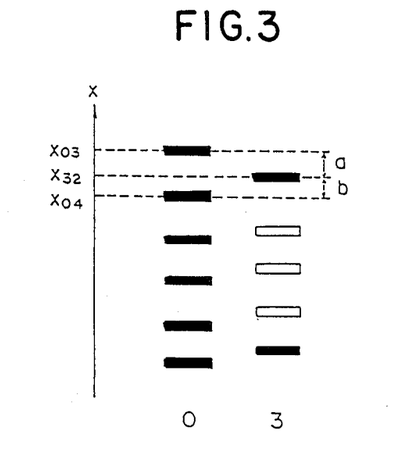
FIG. 3 is a partial view of a synthesized reference row and the third resolved row.

In the second place, the comparing-identifying process among the rows included a process for finding out the same resolved products among the rows, that is for instance, the resolved products constituting the resolved row of (G) are found out from comparison between the row of (G) and the row of (G0+(A). However, if the resolved rows are distorted as described hereinbefore, the corresponding positions of resolved products among the rows are not always coincide with each other on X-coordinate as shown in FIG. 3. The correction of the distortion has been carried out by visual judgement. According to the present invention, the distortion is automatically corrected so that the resolved rows can be compared and identified accurately using a reference row and reference sampling points therein without relying on the visual judgement.

The correction according to the present invention will be described referring to FIGS. 2 and 3.

In FIG. 2, there is observed such distortion as mentioned above among the first to fourth rows, but it is noted that the distortion between the first and second rows is rather small.

Based on the above-mentioned fact, a logical sum operation between the sampling points in the first row and the sampling points in the second row is performed, so that a row composed of sampling points for all the four kinds of base specific cleavage products which consists of (G) specific cleavage products, (A) specific cleavage products, (T) specific cleavage products and (C) specific cleavage products, namely a reference row (internal reference row), is newly obtained. Assuming that the sampling points $\{S_{0n}\}$ in the obtained reference row are reference sampling points, wherein 0 represents the reference row and {} represents a set of sampling points, then the set of reference sampling points $\{S_{0n}\}$ consists of $\{S_{1n}\}$ and $\{S_{2n}\}$. This synthesis is represented by the operation:

$$\{S_{0n}\} = \{S_{1n}\} U \{S_{2n}\}$$

wherein U represents a logical sum operator.

Secondly, the sampling points $\{S_{3n}\}$ in the third row which is adjacent to the second row constituting the reference row are compared and identified with the reference sampling points $\{S_{0n}\}$ in the reference row. Thus, the reference sampling points are interpolated in the third row.

For instance, concerning the sampling point $S_{3,2}$ in the third row, the position $(X_{3,2})$ of the sampling point $S_{3,2}$ is compared with the positions $(X_{0,3})$ and $(X_{0,4})$ of the reference sampling points $S_{0,3}$ and $S_{0,4}$ in the reference row. Providing $$|X_{0,3} - X_{3,2}| = a$$

$$|X_{0,4} - X_{3,2}| = b,$$

and a>b, the sampling point $S_{3,2}$ is regarded to have the same X-coordinate as the reference sampling point $S_{0,4}$ and assigned to $S_{0,4}$. The same operation as mentioned above is repeated, so that all sampling points in the third row are assigned to any one of the reference sampling points. The residual reference sampling points to which the sampling points in the third row are not assigned are interpolated in the third row based on the assigned sampling points $\{S_{3,n}\}$ in the third row, to obtain a set of imaginary reference sampling points $\{S_{3,m}\}$ in the third row, wherein m is a positive integer and coincides with the number n of reference sampling point in the reference row. Thus, an imaginary reference row is formed in the area of the third row by transferring the reference row (zeroth row) synthesized from the first and second rows.

FIG. 3 is a partial view of the reference row (the zero row) synthesized on the digital image data and the third row. In FIG. 3, blackened tetragons (bands) represent sampling points in each row corresponding to resolved portions of the radioactively labeled cleavage products and unblackened tetragous represent interpolated reference sampling points.

In the third place, each sampling point $S_{4n}$ in the fourth row which is adjacent to the third row is assigned to any one of the reference sampling points $\{S_{0n}\}$ with reference to the obtained reference sampling points $\{S_{3m}\}$.

As mentioned above, a set of imaginary reference sampling points $\{S_{km}\}$ is successively obtained in each row with reference to the set of reference sampling points $\{S_{on}\}$ in the reference row, and at the same time every sampling point $S_{kn}$ is assigned to any one of the reference sampling points $\{S_{0n}\}$.

Finally, the above first and fourth rows are rearranged. That is, an operation between the first and third rows, $$\{S_{1n}\} \cap \overline{\{S_{3n}\}} = \{S_{5n}\}$$

wherein $\cap$ represents a logical product operator, is performed, so that an imaginary fifth row having a set of sampling points $\{S_{5n}\}$ is newly obtained. The obtained fifth row corresponds to a resolved row of adenine specific cleavage products alone. The same operation is performed between the second and fourth rows to obtain the sixth row having a set of sampling points $\{S_{6n}\}$. The obtained sixth row corresponds to a resolved row of only thymine specific cleavage products. Accordingly, the following four rows are newly arranged:

(3)-(G) specific cleavage products,
(4)-(C) specific cleavage products,
(5)-(A) specific cleavage products,
(6)-(T) specific cleavage products.

Concerning the third, fourth, fifth and sixth rows, the imaginary reference sampling point $S_{km}$ in each row is compared with the real sampling point $S_{kn}$ in that row in an increasing order of m. Where the former coincides with the latter, the reference sampling point $S_{0n}$ corresponding to said $S_{km}$ is replaced with the coincident sampling point $S_{kn}$. Upon rearrangement of the reference sampling points in an increasing order of n, the following arrangement can be obtained.

$S_{3,1}, S_{4,1}, S_{6,1}, S_{3,2}, S_{5,1}, S_{5,2}, S_{6,2}, S_{3,3}, S_{4,2},$

Into the above arrangement, $S_{3n}=G$, $S_{4n}=C$, $S_{5n}=A$ and $S_{6n}=T$ are introduced to give the following scheme.

G-C-T-G-A-A-T-G-C-

Thus, the base sequence of one chain molecule of DNA can be determined. The representation mode of the information on the base sequence of DNA obtained as described hereinbefore is by no means limited to the above-mentioned mode, and other representation modes may be utilized optionally. For instance, the relative amount of resolved base specific cleavage products can be also obtained for representation by processing the level of signal on the scanning line with an optional operation, if desired.

Further, the base sequence of both chain molecules of DNA can be represented. That is, given the information on the combination between the four bases, namely A-T and G-C, the sequence of DNA is represented by the following scheme.

G-C-G-C-A-A-T-G-C-

C-G-C-G-T-T-A-C-G-

The method for determining the base sequence of DNA utilizing the aforementioned combinations of (G, G+A, T+C, C) is an example of the determination of the sequence of DNA, and the signal processing of the present invention is by no means limited to the above combination, but various combinations are successfully employable to determine the sequence of DNA in the same manner as described above. Whatever combination is utilized, however, the combination is required to contain a mixture of all the base specific cleavage products (G, A, T, C), or to be such a combination that a reference row (internal reference row) of all the cleavage products (G, A, T, C) is obtained by synthesis from all or part of resolved rows of base specific cleavage products.

In the case of using the mixture of all the cleavage products, the resolved row of the mixture (reference row) is not always required to be provided at the center of a support medium. Nevertheless, it is preferably provided at the center thereof in order to determine the base sequence of DNA with higher accuracy.

On the other hand, in the case of obtaining a reference row through synthesis, the reference row can be synthesized from any resolved rows close to each other on a support medium, but it is preferably synthesized from plural resolved rows in the center area thereof to determine the sequence of DNA with higher accuracy. Further, the resolved row for snythesizing the reference row are preferably to exist adjacent to each other.

In the present invention, for example, another combination (G, A, T, C) may be utilized to determine the base sequence of DNA. Otherwise, the sequence of a specific base can be also determined using the combination of at least one group of base specific cleavage products and a suitable reference substance (for instance, a mixture of each base specific cleavage products).

In the above-mentioned example, the present invention was described referring to the four rows of the groups of radioactively labeled cleavage products resolved in one dimensional direction on the support medium, but the resolved rows can by no means restricted to four. The signal processing method of the present invention is more effectively applied to five or more rows. The identification according to the invention is performed to successively correct the deviation of resolved rows starting from the reference row. Accordingly, the present invention is more effectively applied to rows of as many as possible. Further, the base sequences of two or more kinds of DNA can be simultaneously determined on a single support medium, according to the invention. In this case, the reference row for one kind of DNA can be utilized for another kind of DNA. If desired, the number of resolved rows may be less than four.

The information on the base sequence of DNA determined through the above-mentioned signal processing is output from the signal processing circuit 10, and subsequently transmitted to a recording device (not shown), directly or optionally via storage in a storing means such as a magnetic tape.

Various recording devices based on various systems can be employed for the above-described purpose, for instance, a device for visualizing optically by scanning a photosensitive material with laser beam, etc., a display means for visualizing electrically on CRT, etc., a means for printing a radiation image displayed on CRT by mean of a video printer, and a means for visualizing on a heat sensitive recording material using thermic rays.

It is further possible to perform the genetic physiological information processing such as comparison between the obtained base sequence of the DNA and the base sequence of another DNA which has been already recorded and stored in a suitable place.

We claim:

1. A signal processing method in autoradiography for determination of the base sequence of DNA or a DNA fragment, employing radioactively labeled cleavage products obtained by specifically cleaving the DNA or DNA fragment labeled with a radioactive element, comprising the steps of:
   (1) providing at least two sets of reference mixtures each consisting essentially of guanine specific cleavage products, adenine specific cleavage products, thymine specific cleavage products and cytosine specific cleavage products;
   (2) providing at least one group of cleavage products or a mixture thereof containing at least one kind of the base specific cleavage products;
   (3) resolving both the reference mixtures provided in step (1) and the product group provided in step (2) one-dimensionally in such parallel relation that the resolved rows of said two sets of reference mixtures (1) sandwich at least one resolved row of the product group (2) to form at least three resolved rows on a support medium;
   (4) obtaining an autoradiograph having locational information on groups of radioactively labeled cleavage products contained in said rows on the support medium;
   (5) generating an electrical digital signal corresponding to said autoradiograph including said rows;
   (6) detecting reference sampling points in a reference row, the reference row being the resolved row of the mixture (1) of cleavage products comprising four kinds of base specific cleavage products;
   (7) detecting sampling points in the resolved row other than the reference row; and
   (8) comparing the reference sampling points in the reference row with sampling points in a resolved row adjacent to said reference row to identify the sampling points in the adjacent resolved row.

2. The signal processing method in autoradiography as claimed in claim 1, wherein the sampling points are detected by processing the digital signal on respective scanning lines for the plural resolved rows with at least one processing selected from the group consisting of smoothing processing and threshold-processing.

3. A signal processing method in autoradiography for determination of base sequence of DNA or DNA fragment, employing at least three groups of radioactively labeled cleavage products obtained by specifically cleaving the DNA or DNA fragment labeled with a radioactive element, comprising:
   (1) providing a mixture of cleavage products comprising four kinds of base specific cleavage products consisting essentially of guanine specific cleavage products, adenine specific cleavage products, thymine specific cleavage products and cytosine specific cleavage products; and
   (2) providing at least two groups of cleavage products in which one group of cleavage products acontains at least one kind of base specific cleavage products different from base specific cleavage products contained in the other group of cleavage products,
   (3) detecting sampling points in the resolved rows other than the reference row;
   (4) comparing the reference sampling points in the reference row with sampling points in a resolved row adjacent to said reference row to identify the sampling points in the adjacent to said resolved row for which the reference sampling points are determined in the process (3) to identify the sampling points in the adjacent resolved row.

4. The signal processing method in autoradiography as claimed in claim 3, wherein the resolved rows other than the reference row are provided in both sides of the reference row on the support medium; and the process (3) is carried out on said resolved rows provided in both sides of the reference row.

5. The signal processing method in autoradiography as claimed in claim 3 or 4, wherein the sampling points are detected by processing the digital signal on respective scanning lines for the plural resolved rows with at least one processing selected from the group consisting of smoothing processing and threshold-processing.

6. The signal processing method in autoradiography as claimed in claims 3 or 4, wherein the employed cleavage products of DNA or DNA fragmeent contain at least five groups of cleavage products consisting of:
   (1) guanine specific cleavage products+adenine specific cleavage products+thymine specific cleavage products+cytosine specific cleavage products;
   (2) base specific cleavage products containing guanine specific cleavage products;
   (3) base specific cleavage products containing adenine specific cleavage products;
   (4) base specific cleavage products containing thymine specific cleavage products; and
   (5) base specifically cleabed products containing cytosine specific cleavage products.

7. A signal processing method in autoradiography for determination of base sequence of DNA or DNA fragment, employing at least four groups of radioactively labeled cleavage products obtained by specifically cleaving the DNA or DNA fragment labeled with a radioactive element, comprising:
   (1) providing a mixture of cleavage products comprising four kinds of base specific cleavage products consisting essentially of guanine specific cleavage products, adenine specific cleavage products, thymine specific cleavage products and cytosine specific cleavage products; and
   (2) resolving said cleavage products one-dimensionally in parallel relation to each other to form resolved rows on a support medium,
   (3) obtaining an autoradiograph having locational information on groups of radioactively labeled cleavage products contained in said rows on the support medium;
   (4) generating an electrical digital signal corresponding to said autoradiograph including said rows;
   (5) detecting sampling points in each resolved row;
   (6) synthesizing a reference row from the plural resolved rows and assigning the sampling points in the reference row to reference sampling points;
   (7) comparing the reference sampling points in the reference row with sampling points in a resolved row adjacent to the reference row employed for the synthesis of said reference row to identify the sampling points in the adjacent resolved row and determining imaginary reference sampling points in said resolved row based on this indentified sampling points; and
   (4) comparing said determined imaginary reference sampling points with sampling points in a resolved row adjacent to said resolved row for which the reference sampling points are determined in the process (3) to identify the sampling points in the adjacent resolved row.

8. The signal processing method in autoradiography as claimed in claim 7, wherein resolved rows are provided in both sides of the resolved rows used for the systhesis of reference row on the support medium; and the process (3) is carried out for said resolved resolved rows provided in both sides thereof.

9. The signal processing method in autoradiography as claimed in claim 7 or 8, wherein the sampling points are detected by processing the digital signal on respective scanning lines of rht eplural resolved rows with at least one processing selected from the group consisting of smoothing and threshold-processing.

10. The signal processing method in autoradiography as claimed in claim 7 or 8, wherein the employed cleavage products of DNA or DNA fragment contain at least four groups of cleavage products consisting of:
(1) guanine specific cleavage products;
(2) guanine specific cleavage products;+adenine specific cleavage products;
(3) thymine specific cleavage products;+cytosine specific cleavage products;
(4) cytosine specific cleavate products.

* * * * *